United States Patent

Frisken

[11] Patent Number: 5,577,057
[45] Date of Patent: Nov. 19, 1996

[54] MODELOCKED LASERS

[75] Inventor: Steven J. Frisken, Coogee, Australia

[73] Assignee: Telstra Corporation Limited, Sydney, Australia

[21] Appl. No.: 108,660

[22] PCT Filed: Mar. 2, 1992

[86] PCT No.: PCT/AU92/00093

§ 371 Date: Sep. 20, 1993

§ 102(e) Date: Sep. 20, 1993

[87] PCT Pub. No.: WO92/16037

PCT Pub. Date: Sep. 17, 1992

[30] Foreign Application Priority Data

Mar. 1, 1991 [AU] Australia .................................. PK4902
Aug. 23, 1991 [AU] Australia .................................. PK7999

[51] Int. Cl.⁶ ........................................................ H01S 3/30
[52] U.S. Cl. ................................ 372/18; 372/6; 372/25; 372/94
[58] Field of Search ........................... 372/6, 25, 94, 372/19, 18; 385/28, 26; 356/350

[56] References Cited

U.S. PATENT DOCUMENTS

| 3,873,825 | 3/1975 | Jones et al. | 372/26 |
| 3,988,704 | 10/1976 | Rice et al. | 372/18 |
| 4,787,714 | 11/1988 | Greene et al. | 372/21 |
| 5,018,857 | 5/1991 | Sanders et al. | 356/350 |
| 5,050,183 | 9/1991 | Duling, III | 372/94 |
| 5,251,230 | 10/1993 | Lai et al. | 372/25 |
| 5,311,525 | 5/1994 | Pantell et al. | 372/6 |

FOREIGN PATENT DOCUMENTS 2-310982 12/1990 Japan.

*Primary Examiner*—Leon Scott, Jr.
*Attorney, Agent, or Firm*—Baker & Daniels

[57] ABSTRACT

A configuration enabling passive modelocking in an optical fiber device is disclosed, utilizing the non-linear Kerr effect. Various configurations are disclosed, using both standard and polarization maintaining fiber, and a bulk optics implementation. One embodiment comprises a figure of eight arrangement formed by two cross-coupled fiber loops, one of the loops being a Sagnac mirror. A further embodiment exploits the non-linearity of polarization in polarization maintaining fibers.

21 Claims, 9 Drawing Sheets

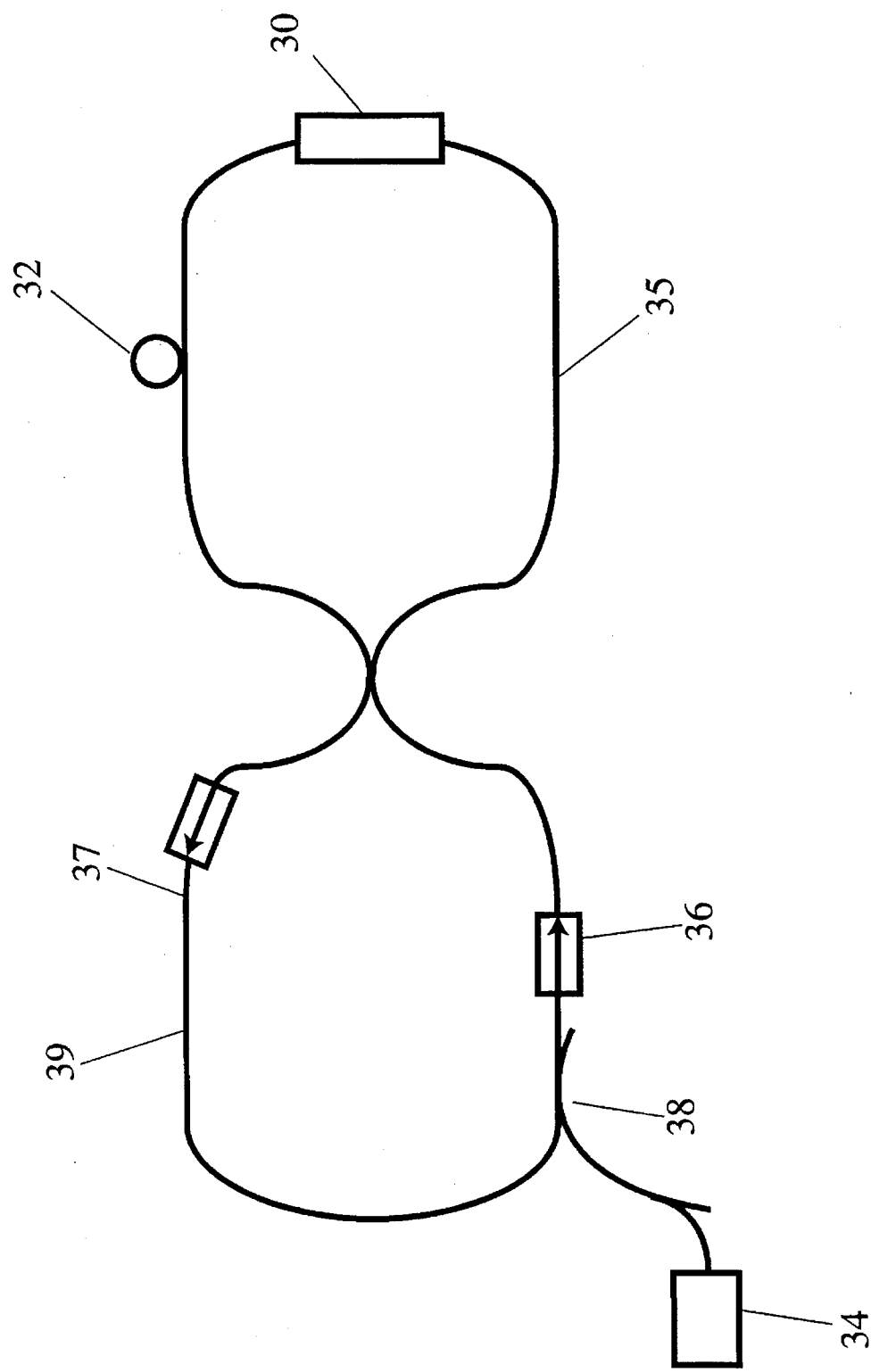

MODELOCKED LASERS

TECHNICAL FIELD

The present invention relates to lasers, and in particular to mode-locked lasers suitable for the production of ultra-short pulses of light.

BACKGROUND ART

The mode-locking of a lasers to produce short pulses of light is known in the prior art. A mode of a laser refers to a discrete wavelength which can propagate in the laser cavity, because of the standing wave conditions for a linear cavity or because of phase matching conditions for a ring laser. The process of short pulse generation relies on the modes of a laser being locked in phases at some point in the cavity, such that the interference of these modes with each other produces a short duration pulse when the phases add constructively, and no pulse when the modes add destructively. The width of the pulse is related to the number of modes which can be locked together. Mode locking can be classified as either passive or active.

Active mode-locking of a laser occurs when the light in the cavity is actively modulated in such a way as to induce a phase modulation. This can be achieved by gain, loss or phase modulation—for example, amplitude modulation at a given frequency will set up side bands for a given mode. The modulation frequency can be chosen such that the frequencies of these sidebands correspond exactly to the frequencies of the neighbouring modes, which then will assume a phase which is directly related to the first mode. The second mode can the phase-lock in the same fashion with another neighbouring mode. This process can continue until all the modes which receive sufficient gain are phase-locked together. The result is a short pulse of light when the modes are in phase. An alternative way of considering gain (or loss) modulation mode-locking is in terms of the temporal narrowing of pulses after each successive pass through the laser. Upon each transit of the light through the modulator, the peak transmission coincides with the point of maximum intensity. The edges of the pulses are reduced with respect to the peak, and the pulse is narrowed. The process can continue until the narrowing due to the modulation is counteracted by other broadening mechanisms occurring in the loop.

Passive mode-locking of a laser is similar to mode-locking through gain modulation, but in this case the modulation is not provided externally. Passive modelocking is due to the action of a passive component upon the shape of a pulse which is traveling through the laser. Passive mode-locking has been achieved by the insertion of a saturable absorber into the cavity. A saturable absorber is a medium which at the wavelength of interest has an intensity dependent absorption characteristic. At low powers, the absorption is strong, but for higher powers the absorption is reduced due to saturation of the absorbing medium. A pulse passing through a saturable absorber will thus experience greater absorption at the tails of the pulse than at the peak. This allows pulse narrowing to take place, and the gain modulation in turn will permit mode-locking of the laser. This results in a self-pulsating laser. This process can be initiated either by the injection of a pulse, or by the build up of random fluctuations into a pulse. Once initiated, it should continue indefinitely until something is done to disturb the system.

One limitation on prior art modelocking techniques is the speed with which the saturable absorber can achieve saturation. This is not an instantaneous effect, and so limits the temporal direction of the pulses to be wider than some value irrespective of the number of modes under the gain spectrum. Finding a suitable saturable absorber at the wavelength of interest and with the necessary response times limits the systems which can be developed. This is a particular difficulty in fibre systems.

OBJECT OF THE INVENTION

One object of the invention is to provide a mode-locked laser with potential for generating ultra-short pulses.

SUMMARY OF THE INVENTION

According to one aspect the present invention comprises an optical system adapted to form a mode-locked laser, comprising a first optical path, a second optical path, and coupling means connecting the first and second optical paths, at least one of said first and second optical paths including means for providing optical gain, and at least one of said first and second optical paths including means having a refractive index dependent on light intensity.

BRIEF DESCRIPTION OF DRAWINGS

The invention will now be described with reference to the drawings, in which:

FIG. 9 is a schematic illustration of another embodiment of the invention.

DISCLOSURE OF THE INVENTION

The invention relates to the use of a Sagnac switch to passively mode-lock a laser. The system will be explained for the case of a fibre laser, but it will be understood that the invention is applicable to bulk optics lasers. Similarly, while the principle is described for a unidirectional ring laser, it will be understood that the concept is equally applicable to colliding-pulse, linear-cavity lasers, or any other suitable arrangement.

Figure 1:
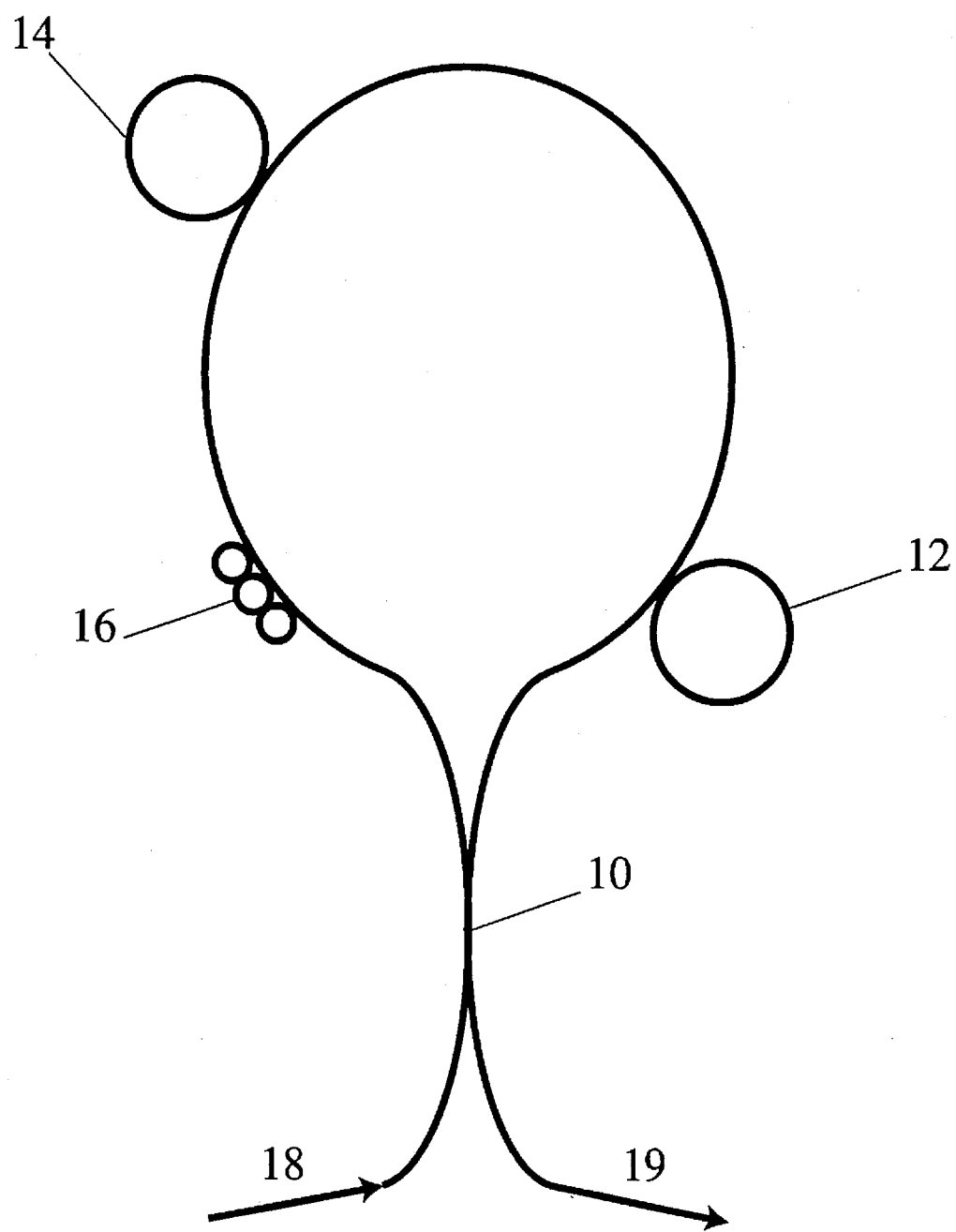
FIG. 1 is a schematic illustration of a Sagnac mirror.

The nonlinear Sagnac interferometer, or Sagnac switch, is a form of intensity dependent optical switch and is illustrated in FIG. 1. When small powers of light are incident in one arm 18 of a coupler 10, with a splitting ratio of 50%, with the two output ports spliced together, the loop can act as a perfect mirror due to destructive interference at the fourth arm 19 of the coupler.

However, if an intensity dependent change in the phase of the light travelling in each direction can be introduced then the destructive interference can be changed to constructive interference and all of the light is then transmitted. One way to achieve this change is through the Ker Effect in optical fibres. The Kerr effect results from the fact that the refractive index is not a constant (linear regime), but has a small dependence upon the intensity of light (i.e. is nonlinear). If a pulse of light travelling in one direction is amplified before travelling through the nonlinear fibre, whereas the pulse travelling in the opposite direction travels through the nonlinear medium before being amplified, then each pulse will experience a different refractive index. Thus the phase change upon arriving at the coupler the second time will be different, and if the difference is equal to $(2n+1)\pi$ then the pulses will constructively interfere in the output port of the coupler achieving transmission of the initial pulse.

Consider a pulse entering the fibre coupler 10 and passing in a clockwise direction around the loop. It passes through nonlinear fibre 14 and is then amplified by optical amplifier 12. However, an identical pulse travelling anticlockwise is first amplified by optical amplifier 12 and then passes through the nonlinear fibre 14. As the refractive index of the nonlinear fibre is intensity dependent, such a pulse effectively travels a longer path length. Hence different phase changes occur for each path on returning to the coupler.

The polarisation controller 16 can induce a birefringent phase change to allow the transmission properties to be tailored to the application. In this way the Sagnac switch can act as a threshold device. The pulses are blocked at low intensity, and are transmitted at higher intensities.

The invention is based on the discovery that the intensity dependent transmission of a nonlinear Sagnac switch can be used to mode-lock a laser, in that it can produce narrow pulses with an extremely fast response time. The invention is based further on the discovery that the nonlinear soliton propagation of pulses within the laser can be used to further narrow the pulses in a stable fashion, when the correct conditions such as gain, bandwidth and nonlinear fibre length are chosen.

Figure 2:
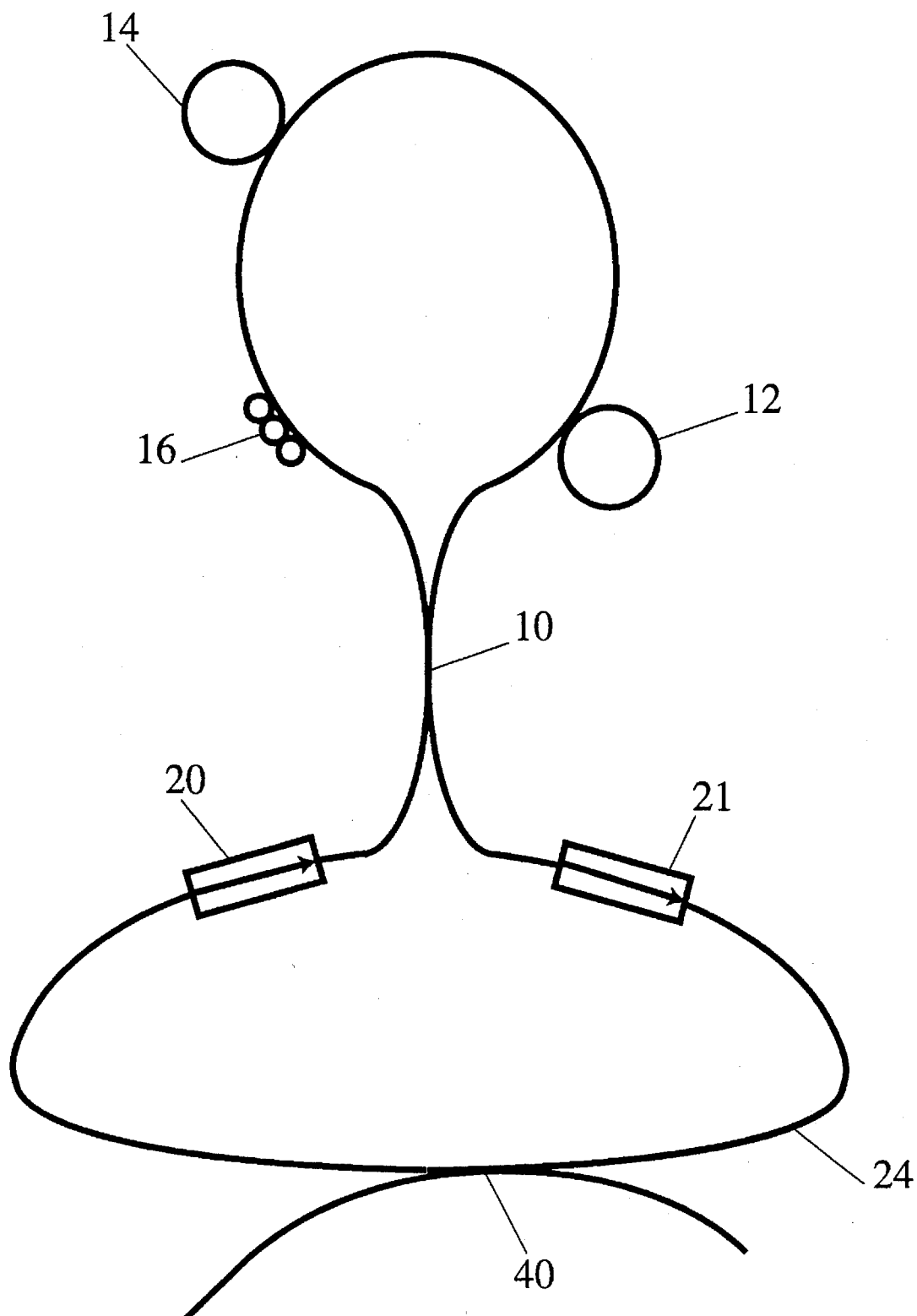
FIG. 2 is a schematic illustration of one embodiment of the invention.

FIG. 2 illustrates one embodiment of the invention comprises a fibre Sagnac switch incorporated in a unidirectional loop. A fibre coupler 40 provides the output coupling and a means to inject a pulse to initiate the mode-locking. Alternatively, the light fluctuations may spontaneously give rise to the effect.

Referring now to FIG. 2, output 19 and input 18 of FIG. 1 are connected to form a feedback loop 24. The components within this feedback loop 24, whose function will be described below, are not essential to the invention.

The inventive device has the following properties which are advantageous for passive mode-locking:

i/ The switch can operate with gain because of the optical amplifier 12 within the loop.

ii/ The switch acts to narrow pulses which pass through it by having a higher transmission at high power. The Kerr effect is in many media an extremely fast reaction, so that even very short pulses can be narrowed. This reduces the effect of 'walk off' where the peak of transmission lags the peak of intensity, and the laser cavity passive mode-locking is detuned from its natural resonance.

iii/ Although the transmission curve of a Sagnac interferometer is periodic in intensity (with a $\sin^2$ dependence), the length of the nonlinear fibre can be chosen so that the intensity remains in the first transmission period, i.e. with phase changes less than $\pi$.

The isolators 20, 21 are includes to suppress reflections back into the Sagnac loop which could induce spurious lasing and to ensure unidirectional operation of the laser.

A preferred implementation uses polarisation preserving fibre throughout the device, which removes the need for polarisation controller 16. It is further preferred that isolators of single polarisation type are used.

The use of a single polarisation isolator has been found to be important in the laser. This type of isolator is preferable in both polarisation preserving and non-polarisation preserving designs of the laser. This is because commercially available polarisation independent isolators tend to have polarisation dispersion (ie. different group delays through the device for the two principal polarisations). This leads to a transmission characteristic which is cyclic in wavelength and has detrimental effects on the spectrum of the laser output causing longer output pulses, multiple output pulses and higher self-starting threshold powers.

A steady state pulse stream may be obtained because any one of the following conditions applies:

(1) The pulse narrowing in the Sagnac loop and the nonlinear fibre are counter-balanced by the broadening due to the finite gain bandwidth. At the point of balance, an increases in intensity leads to an increased narrowing which will decrease the gain because of the limited gain band width, thus decreasing the intensity. On the other hand a decrease in intensity will broaden the input to the optical amplifier thus increasing the gain and hence intensity. It is possible then to reach a stable position where there is no increase or decrease in intensity or pulse width and any perturbations cause the opposite effect to the perturbation.

(2) Alternatively the laser can be designed by choice of the gain and nonlinear parameters such that the gain of the ring laser is limited by the reduced transmission once the complete switching conditions of the Sagnac switch has been passed. This occurs at input intensities greater than those required to give a $\pi$ phase change. The exact balance conditions can be decided through the choice of the lengths of nonlinear fibre, the gain medium and loop lengths as will be apparent to one skilled in the art.

It will be appreciated that other conditions which provide steady state pulse streams or bursts also fall within the scope of the invention. It will be appreciated that single pulse per period operation and negligible CW power are important characteristics of any practical device. The former will be addressed below. Negligible CW output power is achieved by tuning the Sagnac loop for minimum linear (ie. low power) transmission. This may be achieved by appropriate adjustment of the polarisation controller 16 in the embodiments of FIG. 2 and the like.

It is also clear that the narrow high intensity pulse can evolve via many iterations of the loop from a much broader intensity pulse, which could take the form of an external trigger or the spontaneous fluctuations of light in the gain medium. As soon as the intensity is sufficient to give gain through the Sagnac switch to overcome the losses through the fibre ring, then each successive loop will both narrow the pulse and provide some additional gain until the gain begins to saturate.

One Sagnac switch that has not been discussed in the literature but which has the advantage of being a very low threshold device involves having an Erbium doped optical amplifier and a semiconductor optical amplifier both within the Sagnac loop. The very slow time responses of the Erbium amplifier means that the pulse sees it as simply a gain medium, whereas the much faster nonlinearity of the semiconductor amplifier receives pulses of unequal intensity, and hence different refractive indices in the two directions. Having high gain and low threshold switching means that this may be suitable as a low peak power mode-locked laser, where the very short pulse widths are not so important. Gain saturation in this laser would come about because the pulse width is much shorter than the relaxation time for the semiconductor amplifier or at the point where full switching is achieved.

A Sagnac switch including both an SCOA and erbium fibre optical amplifier differs in its operation from other Sagnac switches in respect of the low optical input power required to achieve switching. Additionally the switching characteristic is such that it is not cyclical with increasing optical power, but instead it saturates. This is due to the saturation of the semiconductor optical amplifier (SCOA) itself causing unequal gain in both directions as well as unequal phase. FIG. 9 illustrates a mode-locked laser arrangement utilising this aspect of the present invention, with both the SCOA 30 and erbium fibre amplifier 32 within the Sagnac loop 35. The feedback loop 39 includes coupler 38 for connecting pump laser 34, isolators 36 and 37, and attenuator 31.

A laser which uses the above implementation of the Sagnac switch has several novel properties. These include the passive generation of square and rectangular wave optical output. This process is due to the mismatch in the path length between the Sagnac coupler and the SCOA which results in long pulses of light switching themselves off after a time related to the mismatch distance. By correct positioning of the SCOA within the loop it is possible to obtain different frequency square waves.

The second feature of the Laser which uses this Sagnac switch is the ability to passively modelock at very high harmonics of the fundamental. This results from the fast relaxation time of the SCOA being much shorter than the loop transit time and pulse repetition rates of several GHz have been obtained although the fundamental loop frequency is only several MHz. This aspect may be particularly important for telecommunications applications such as for the generation of high bit rate pulse streams, or recovering a clock from a data stream. The latter would be achieved by locking the laser to an external optical input (data stream) at some harmonic of the fundamental.

Figure 3:
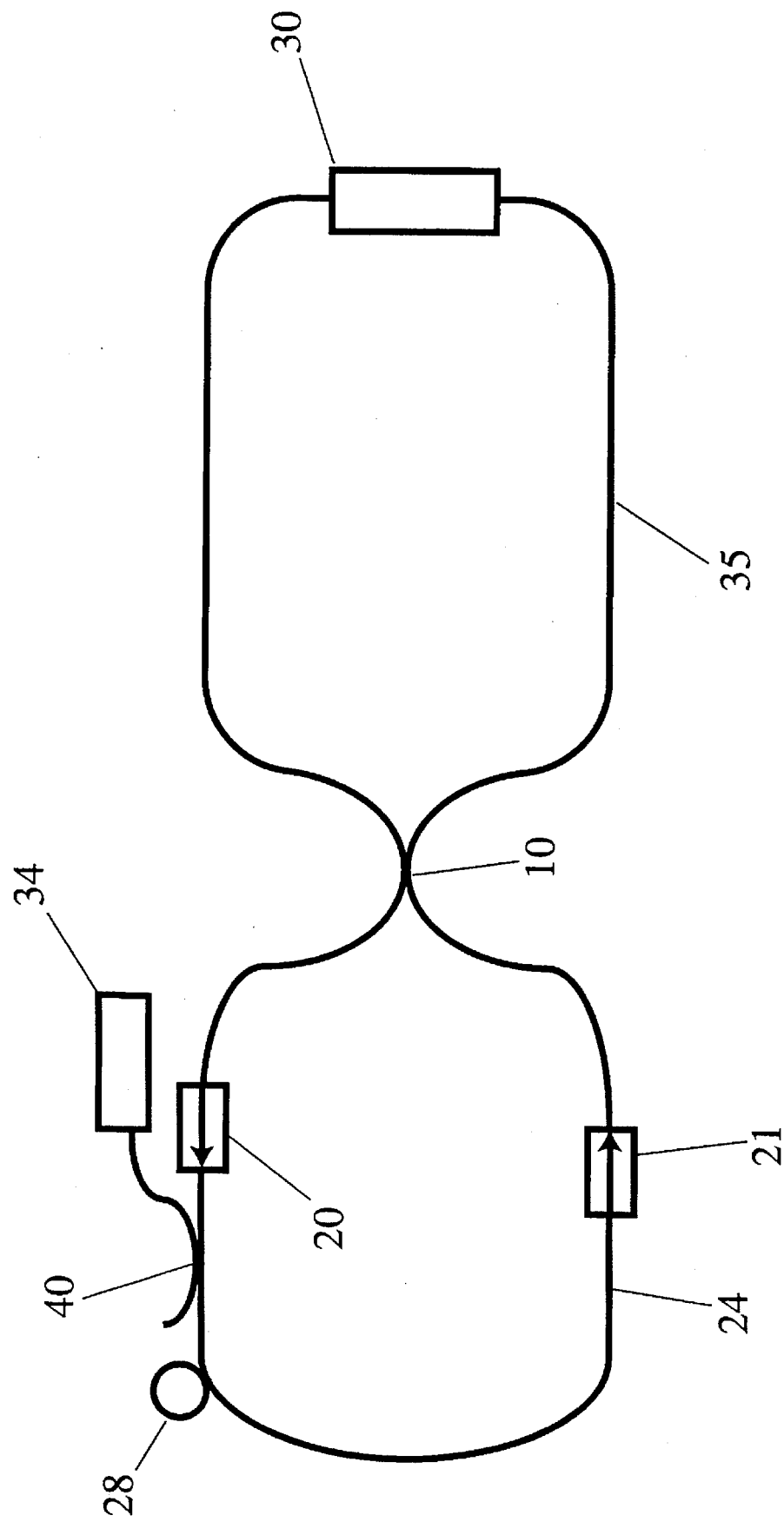
FIG. 3 is a schematic illustration of a further embodiment of the invention.

It will be appreciated that the semiconductor amplifier in this example may be replaced by any suitable fast saturable gain medium, or a fast saturable absorber. The above described implementation of the invention allows a very convenient method for production of ultra short pulses for use in for example, telecommunication, sensing spectroscopy and instrumentation. Being an all fibre device which can be pumped by semiconductor pump sources it is comparatively simple, flexible and robust in comparison to prior art devices. One implementation uses an Erbium-doped fibre amplifier in the Sagnac loop to provide pulses in the 1.55 μm region. Other dopants can be used as the gain medium to access other wavelengths, and the technique is independent of the wavelength chosen, so long as a gain medium is available. The pulse width narrowing attainable is essentially limited only by the band width of the gain medium. A further aspect of the invention relates to the positioning of the gain medium of SLA in implementations using the SLA as the non-linear medium. Using the SLA as the nonlinear medium to passively modelock the laser can often be best achieved by having the gain medium in the feedback loop of the laser and only the SLA in the Sagnac nonlinear mirror as shown in FIG. 3. Having the SLA nearly central in the loop tends to give the shortest duration highest peak power pulses. The nonreciprocal intensity through the nonlinear medium is now caused by the non-equal coupling into the SLA. Conceptually, this is identical to the implementation disclosed with reference to FIG. 9 in all respects except the position of the gain medium. The reduced nonlinearly experienced in this case means that the switching power is increased favouring higher power pulse generation.

A further implementation of the invention relates to an alternative arrangement of the gain media.

One problem that has been encountered is the large powers which are needed to pump the laser using the Kerr non-linearity in fibre according to the present invention, making it difficult to implement using available low cost and convenient sources such as diode pumps. A small modification to the design facilitates the operation of the inventive mode-locked laser at low pump powers by significantly reducing the power required for self starting.

The design locates the gain media in two regions of the laser, which can then be pumped by two diodes as shown or simply by one diode. It has been discovered that preferably only a small gain should be located in the Sagnac loop and the remainder of the gain medium should be located in the feed back loop. This amount could vary due to the effect of intracavity losses.

This design may be used to passively modelock a fibre laser using diode pumps, demonstrating the potential for a very low cost system with all the convenience of operation of diode source pumping.

Theory

A nonlinear Sagnac interferometer has a transmission characteristic which (neglecting any gain) is dependent upon the incident optical power.

$$T(P)=\sin^2(\pi/2 \cdot P/P_{switch}+\Theta_0) \qquad (1)$$

The phase $\Theta_0$ can be adjusted using a polarisation compensator allowing a transmission characteristic at low intensity varying from zero to complete transmission. Passive modelocking of a fibre laser can be achieved by employing the pulse narrowing characteristics of the transmission characteristic to allow broad fluctuations from mode beating of the CW laser to evolve into narrow pulses. In general for low pump power, the magnitude of the fluctuations is much smaller than the switching power, and from Eqn. 1, significant pulse narrowing will only be achieved when $\Theta_0$ is very small. For example for a fluctuation in power corresponding to 1% of the switching power of the Sagnac loop, a 10% compression in the width of a Gaussian pulse requires that $\Theta 0$ be less than 0.008 radians. At this phase the modulation depth (i.e. the difference in transmission between the peak of the fluctuation and the average power) is 1.6 dB and increases rapidly for smaller $\Theta_0$.

When $\Theta_0$ is adjusted to be small to achieve the large modulation depth and pulse narrowing required for effective modelocking, the loss through the Sagnac loop becomes very high for CW light (42 dB for $\Theta_0$ of 0.008 radians) as most of the optical power is reflected. This means that the gain through the laser must be correspondingly large. It is important to note that the gain of the laser even below the threshold for lasing is not necessarily the small signal gain of the fibre as saturation effects due to multiple passes through the gain medium can become important. In the configurations used to date the gain medium has been located in the Sagnac loop, in order to provide the non-reciprocity of intensity. Spontaneous emission originating in the gain fibre is amplified and travels through the return loop to be incident upon the Sagnac loop. Although this spontaneous emission is reflected back to the isolator and out of the system, it is first amplified in both directions through the loop, and so can saturate the available gain. For a suitably high gain fibre is clear that the laser gain below threshold is limited by the saturation power $P_{sat}$ of the spontaneous emission, which for sufficiently high pump power is proportional to the pump power $P_{pump}$.

$$P_{sat} = \eta P_{pump} \tag{2}$$

where the constant of proportionality $\eta$ is a measure of the pump to signal conversion efficiency. The gain G received by the spontaneous in each pass of the gain medium is then given approximately by $$G_2 = P_{sat}/P_0 \tag{3}$$

where $P_0$ is the equivalent noise power for light of quantum energy by corresponding to one photon per mode in a bandwidth $\Delta \nu$ and $n_{pol}$ polarisations. [Desurvire]:

$$P0 = \eta_{pol} h\nu \, \Delta \nu \tag{4}$$

In this simplified analysis we have neglected intrinsic loss and equated the saturation power to the average power at the nonlinear fibre. Some small reduction in the switching power can be made by having single polarisation operation of reducing the available bandwidth $\Delta \nu$, but for a fibre of a given nonlinearity, the main route to reducing the switching power is through increasing the length of the nonlinear fibre to reduce the switching power. This in turn will increase the pulse widths and the instability of laser.

Figure 4:
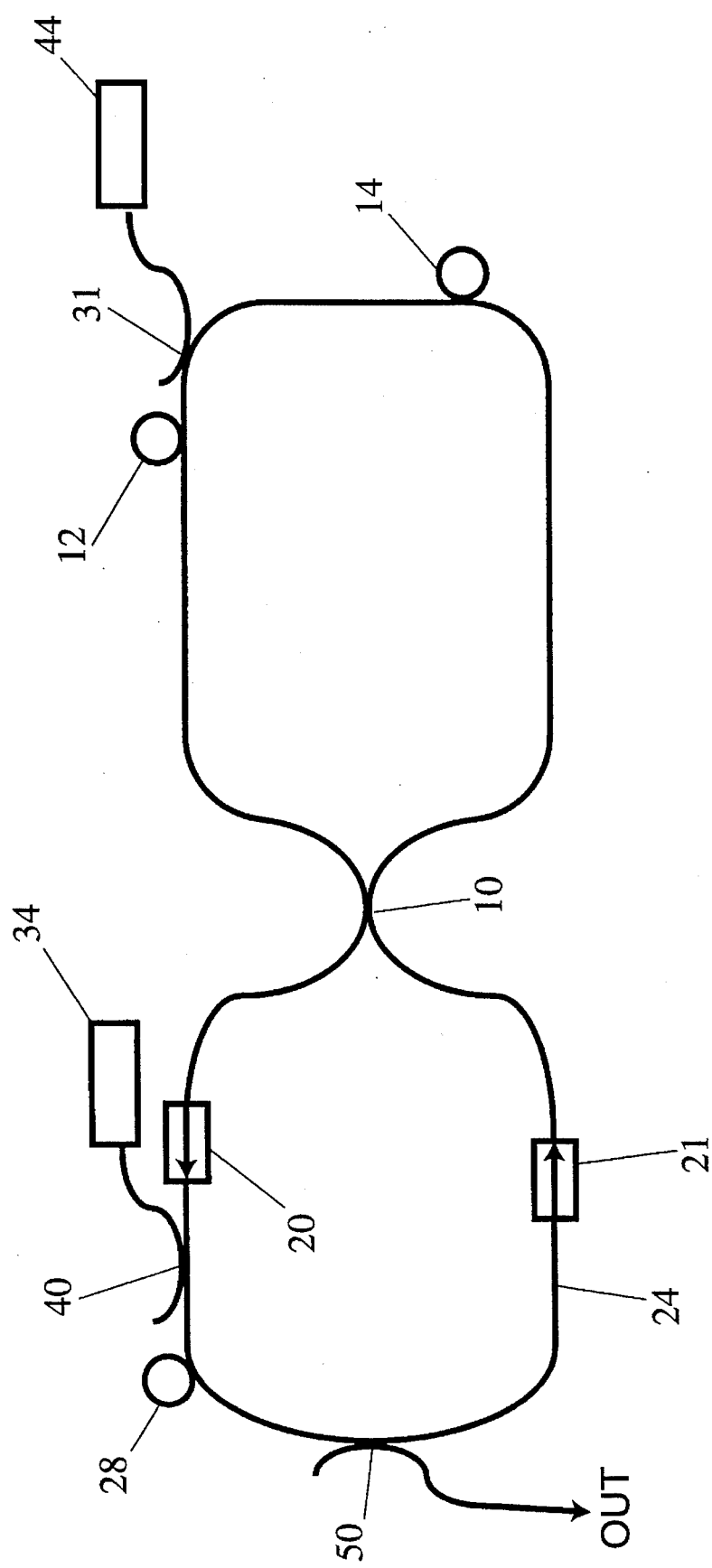
FIG. 4 is a schematic illustration of a further fibre embodiment of the invention.

We now propose an alternative configuration for the laser where the gain medium is divided between the Sagnac mirror and the return arm as shown in FIG. 4. This implementation is similar to FIG. 2, but for the inclusion of fibre amplifier 28. Now only the gain medium in the Sagnac loop receives a double pass of the spontaneous light and so the equation is replaced by $$G_{Sagnac}2 \, G_{return} = P_{sat}/P_0 \tag{5}$$

and the total gain through the laser is given by $$G = G_{Sagnac} \, G_{return} = P_{sat}/(P_0 G_{Sagnac}) \tag{6}$$

A value for $G_{Sagnac}$ is chosen which is large enough to ensure that the counterpropagating pulses in the Sagnac loop are of sufficiently different powers, but small enough to allow the total gain G to be large. This in turn allows the phase $\Theta_0$ to be chosen to be smaller whilst maintaining the condition T.G>=1. In summary, using the same gain medium this configuration allows the pump power to achieve a given gain (and hence modulation depth) to be decreased. This arrangement is particularly suitable for a polarisation maintaining implementation.

A birefringent fibre is one where two polarisations of light incident upon the fibre travel at different velocities through the fibre. Highly birefringent fibre is known as polarisation maintaining fibre because the two polarisation modes cannot couple to each other easily, so light with polarisation parallel to one of the axes will maintain its polarisation after propagating through a length of fibre, in order to make a stable fibre laser, it will be desirable to manufacture the laser in polarisation maintaining fibre.

An important objective for laser performance is negligible CW output power. Negligible CW output power is achieved by tuning the Sagnac loop for minimum linear (ie. low power) transmission. This can be done by careful rotational splice alignment in highly birefringent fibre.

Single pulse per period is important for many of the envisaged applications of this laser. Unless care is taken in the design of the laser, the output tends to be in pulse bunches at the fundamental repetition rate. These pulse bunches display somewhat chaotic behaviour (pulses may move relative to each other and may coalesce or disappear in a random manner). This has a detrimental effect on measured pulse timing jitter. Single pulse per period operation can be obtained as follows.

A short cavity length (shorter Sagnac loop and feedback loop) may be used—our preferred length is approximately 40 m giving a 5 MHz repetition rate. The reason for the use of a shorter cavity is to dissipate more energy per pulse (due to the increased Sagnac loop switching power) and more pulses per second (due to the increased repetition rate) with the aim of dissipating all the available output power in a single pulse per period.

The energy per pulse can be further increased by increasing the duration of the pulses by limiting the available gain bandwidth. The peak power remains "clamped" to the switching power of the Sagnac loop. The use of the Germanium co-doped (rather than Aluminium co-doped) Erbium doped fibre in the optical amplifier(s) restricts the gain bandwidth to about 2 nm. If further pulse broadening is required, optical filtering can be used (a 0.2 nm filter was found to be effecting giving=15 ps bandwidth limited pulses).

Tuning of the repetition rate can be achieved using a variable cavity fibre optic beam expander in the cavity—this has to have low back reflection (<=–40 dB). Continuous tuning of the repetition rate ±50 ppm was found to be readily achievable. To achieve environmental stability with respect to polarisation fluctuations, polarisation maintaining fibres and components should be used. The preferred implementation of a polarisation maintaining (PM) version of this laser is shown in FIG. 4.

The polarisation splitting coupler 31, 40 used are preferably of the surface plasmon type. It has been found that this type of coupler works very effectively as a WDM (wavelength division multiplexing) coupler—that is, it can be used to efficiently combine pump (at 980 nm) and signal (at 1530 nm)). If the input polarisation of the 980 nm pump is chosen to be parallel to the plane of the metal film in the surface plasmon device then less than 1% of the power is cross-coupled. This device therefore works as a PM, WDM coupler provided the splices to the Sagnac loop are such that the lasing wavelength is cross-coupled.

Ideally, the average dispersion parameter of the laser for the lasing polarisation should be positive (equivalent to negative group velocity dispersion, GVD) for optimum performance (ideally between 80 and 200 fs/nm). This allows nonlinear compensation for dispersive pulse broadening through the laser. It should be noted that this requirement is not absolute since the Sagnac loop switch itself can compensate for dispersive pulse broadening.

Typical performance results of a laser according to the foregoing discussion and FIG. 4 is given below. This is presented by way of example only and should not be construed as limitative. All fibre used is polarisation maintaining. The pump lasers 34.44 are 980 nm 50 mW units. Non-linear fibre 14 has dispersion of about 10 ps/nm.Km, and is about 20 m long. Erbium fibre 12 is about 5 m long.

Fibre amplifier 28 is about 10 m long. All isolators are of single polarisation type. Coupler 50 is preferably variable, while couplers 31, 40 are of surface Plasmon type.

0.1 to 0.5 mW average output power

Pulse energy 20 to 100 pJ

Pulse duration 1 to 3 ps

5 MHz repetition rate, single pulse per period

Timing jitter <2 ps RMS

Amplitude noise <0.25% RMS

Continuous tuning of repetition rate ±50 ppm

Another aspect of the present invention relates to a further implementation which allows only one pass of the spontaneous emission through the gain medium, and so is suitable for diode pumped operation. It uses the nonlinearity of the polarisation in polarisation maintaining fibre (PMFs). One advantage of the design is that it may facilitate operation without isolators, making it a truly all fibre device.

This design exploits some special properties of polarisation maintaining fibre in the design.

If the polarisation of the incident light is at an angle to the axis of the fibre, then the light will propagate in both axes, and the polarisation can be rotated by up to twice the angle between light and the fibre axis upon leaving the fibre. This happens when the light in the slow axis is 18 degrees out of phase with the light in the fast axis, due to the different propagation rates. The light will rotate to the original polarisation again over a distance called the beat length, typically a few mm. For a length of fibre comprising many beat lengths it is possible for the nonlinear propagation of light to cancel out the phase difference, if there is a difference in the intensity of the light in both polarisations, i.e. for angles not equal to 45 degrees. This nonlinear polarisation rotation can be used to effectively modelock a fibre laser.

One form of nonlinear switch according to the present invention consists of one or more lengths of what we will term polarisation dispersion compensated highly birefringent fibre. This can be formed by splicing nearly equal lengths of fibre together, the slow axis of one fibre in line with the fast axis of the other. By making one fibre half a beat length longer than the other, this fibre can be used to rotate the polarisation of light by twice the angle that it makes with the fibre axis.

Figure 5A:
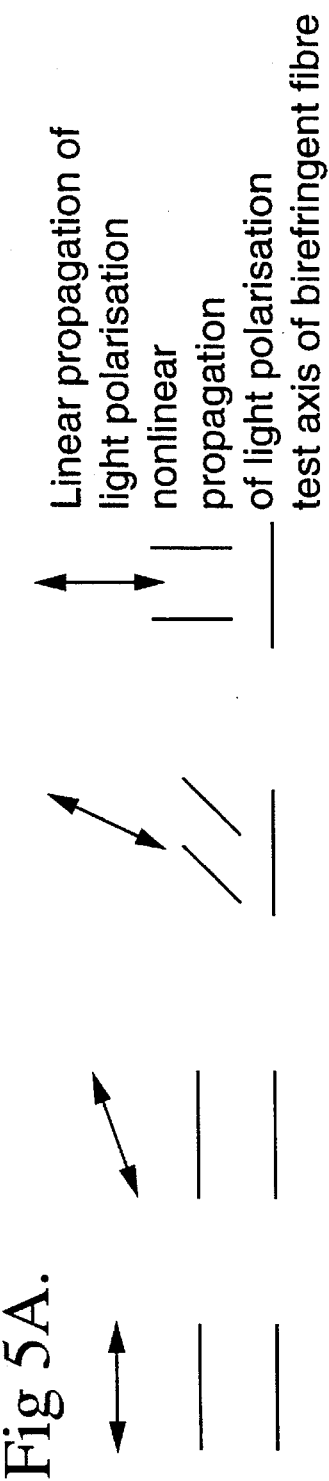
FIG. 5B is a schematic illustration of an embodiment of the invention using birefringent fibre, FIG. 5A showing the polarisation of the light at various points in the device.
Figure 5B:
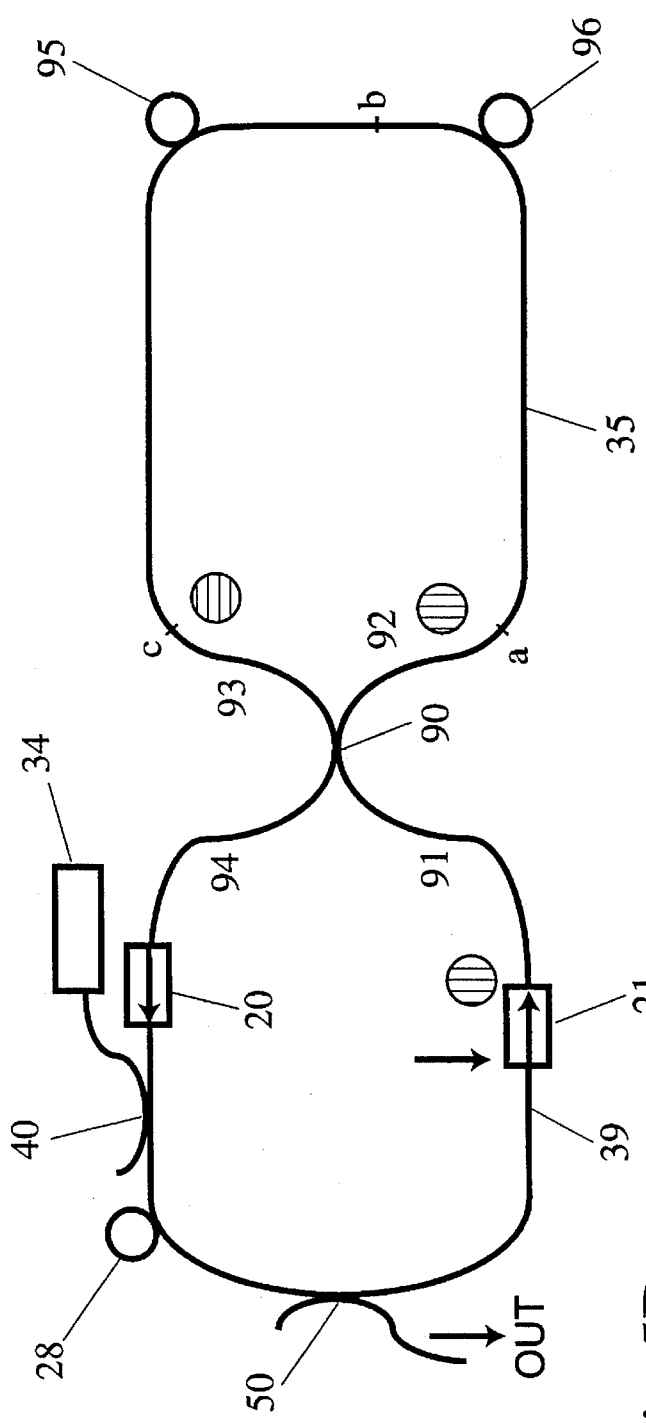

FIG. 5B illustrates how such an intensity switch can be formed from two (as example) such lengths of fibre and a polarisation selective coupler 90. FIG. 5A illustrates the polarisation of light in various portions of the fibre. It will be appreciated that this is by way of example and should not be considered as limitative of the principle involved. Consider firstly region A—A of the illustrated arrangement, and assume horizontally polarised light is incident upon arm 91 of the coupler. In this coupler the horizontal light travels straight through whilst the vertically polarised light is cross coupled. As such, the light travels through to arm 92. At splice a, coupler 90 is spliced to a length of polarisation dispersion compensated birefringent fibre (nonlinear birefringent fibre 96) as described above. The axis of the fibre is made to have an angle of 22.5 degrees to the axis of the fibre of arm 92, and so a rotation of 45 degrees is possible for low intensity (linear) operation. This length of fibre is spliced (splice b) to an equivalent nonlinear birefringent fibre 95, with its axis making an angle of 22.5 degrees to the polarisation state, i.e. 45 degrees angle to the axis of fibre 96. As such the polarisation will have rotated by 90 degrees from its original polarisation. Nonlinear birefringent fibre 95 is then spliced (c) to coupler arm 93, in such a way that the polarisation state as in line with the vertical axis of coupler arm 93, i.e. such that the axis angle of nonlinear fibre 95 is at 22.5 degrees to vertical axis of coupler arm 93. Low intensity horizontally polarised light at coupler arm 92 will be vertically polarised at coupler arm 93 and so will be cross coupled at the polarisation splitting coupler, returning to arm 91. However, light of sufficient intensity at 92 will remain horizontally polarised at coupler arm 93 because of the nonlinear effect described above. This light will then be propagated through to arm 94. The behavior of this switch is thus analogous to that of the nonlinear Sagnac switch, with low intensity light being reflected and high intensity light being able to be transmitted to arm 94. The transmission will in fact also be periodic as a function of the intensity, going as $\sin^2(I)$. This intensity dependent switch is now incorporated into a laser in the full dumbbell shape configuration shown in FIG. 5. The gain medium is now not an integral part of the switching mechanism, and so can be placed at any point in the laser. It is preferable to place it in the feed back loop 39 to maximise the gain in a similar fashion to that described above in the theory.

This design may facilitate an all fibre laser by doing away with the need for isolators. In the basic design the isolators perform two functions—they ensure unidirectional propagation, but more importantly they allow the light reflected from the switch to be removed from the system. In the refinement presented here this become unnecessary if single polarisation fibre is used in the feedback loop. This is because the light reflected has a polarisation orthogonal to the original polarisation, and so will not be transmitted in the single polarisation fibre. Alternatively fibre polarisers could be used at arms 91 and 94 of the polarisation selective coupler, in order to make the system unidirectional, the output coupler 50 could be placed in the region of splice c causing an attenuation in the circulating light in either direction at this point. In this way, the nonlinear rotation would be stronger for the higher power anticlockwise travelling light, which sees the attenuation after traversing the nonlinear medium. As such the pulses would prefer to travel anticlockwise in the switch, establishing a definite direction throughout the laser.

The polarisation splitting coupler is also not essential in this single polarisation laser and can be dispensed with if desired to make a simple ring laser where the polarisers and the nonlinear birefringent fibre then comprise the nonlinear birefringent switch. In this arrangement, illustrated in FIG. 7, the amplifier 81 is of single polarisation fibre, or has an amplifier at either end. One end of the amplifier 81 is connected to the output coupler 50 and the ring is completed by joining this coupler to the other end of the amplifier 1 via a number of nonlinear birefringent fibres as above to cause a 90 degree phase change at low intensities. Illustratively, fibre 85 has an axis at 22.5 degrees to the amplifier axis, and is spliced 89 to fibre 86 with its axis at 45 degrees to fibre 85.

As such, low intensity light will not be able to circulate as it will be rotated to a polarisation which cannot propagate. Fluctuations of sufficient amplitude will be able to rotate the polarisation slightly to allow some transmission, and again, if the gain is large enough to overcome the losses, then it will be possible for passive modelocking to be established.

Figure 7:
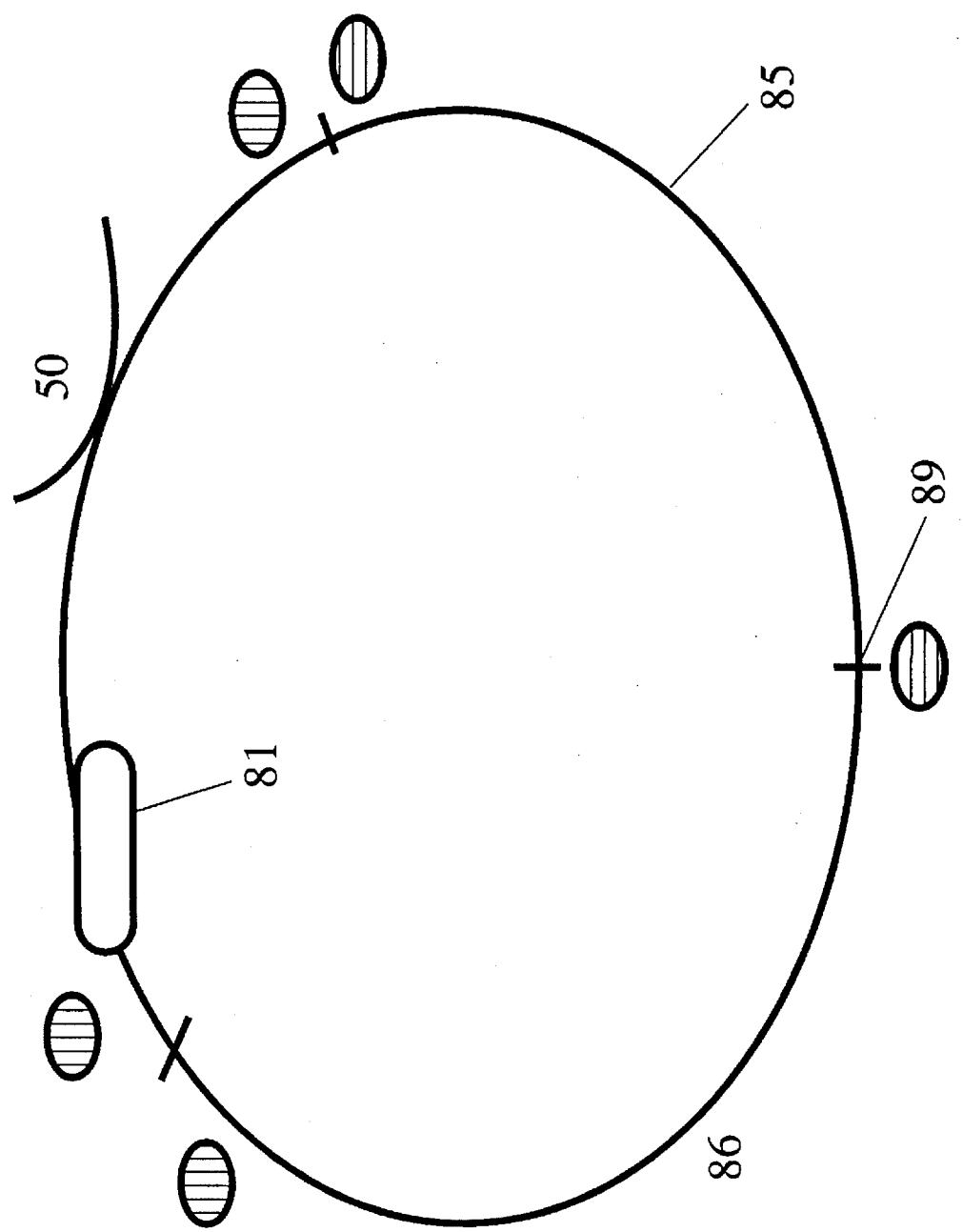
FIG. 7 is a schematic illustration of a further fibre embodiment allowing for single pass operation.
Figure 8:
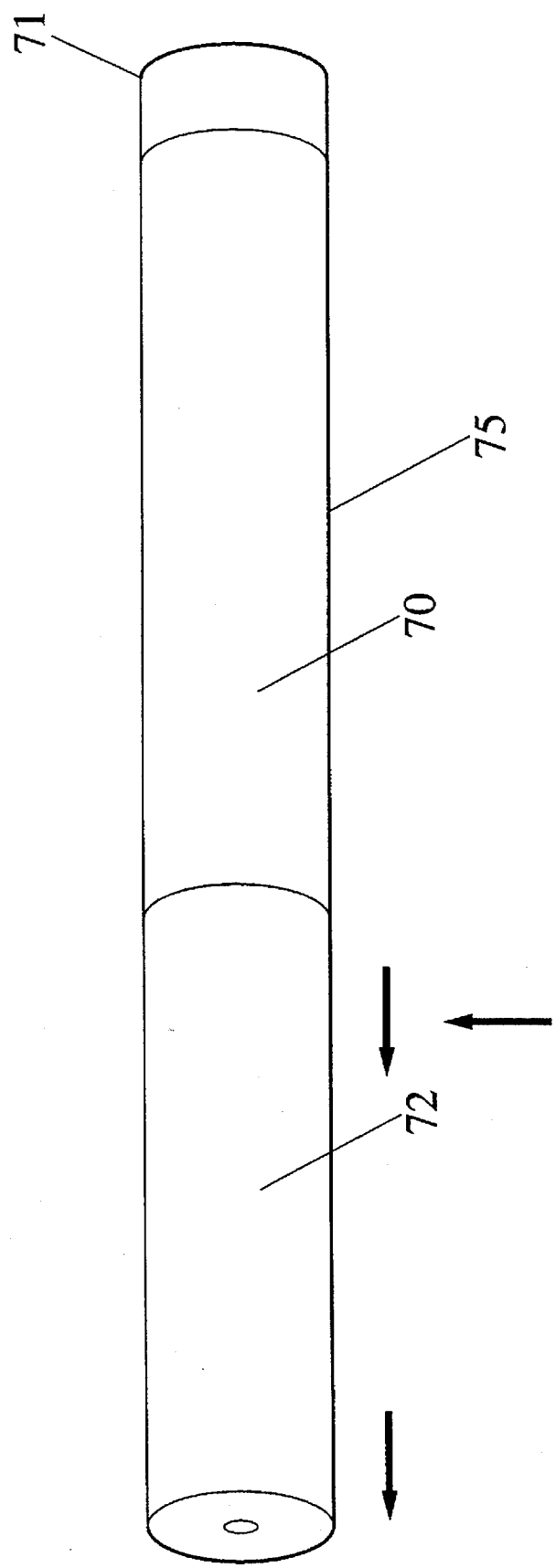
FIG. 8 is a schematic illustration of a linear fibre embodiment of the invention.

A further embodiment of the principle of FIG. 7 may be implemented as a linear laser version, illustrated in FIG. 8, which can be constructed in a linear (talking spatially) arrangement of nonlinear birefringent fibre. The right hand side of the fibre device 75 is in the nonlinear polarisation switch which operates as described following, while the left-hand end is the gain medium, a single polarisation fibre amplifier 72. Light of low intensity, incident upon the switch in the horizontal polarization will be rotated by 45 degrees by the length of polarisation dispersion compensated nonlinear fibre 70, which has its axis spliced at 22.5 degrees to the horizontal. This light is reflected back with a 90 degrees shift in polarisation by rotator and mirror 71. This can be achieved by using a Faraday rotator and a mirror, a birefringent fibre and a mirror, a polarisation dependent coupler, or alternatively by using a reflection grating. Mirrors can be formed simply on fibre by depositing either a dielectric or metallic film onto the cleaved fibre directly.

The operation of this embodiment is then equivalent to those described in relation to FIGS. 5 and 7. At low intensities incident light is reflected back with a 90 degree shift in polarisation which then does not allow the light to propagate in the single polarisation fibre 72. High intensity fluctuations will be partially transmitted because of the nonlinear polarisation rotation, and if the gain is sufficient, passive modelocking can be induced as these fluctuations are amplified and hence able to be sustained.

This configuration is particularly attractive because it allows the pump to be introduced at one end of a length of fibre, and the pulses at the lasing wavelength to be produced at the other end.

There are many variations which are possible within the scope of this invention. There are many variants upon the nonlinear Sagnac interferometer which could be adopted. Some involve the nonlinearity of other materials, such as those which use a semiconductor optical amplifier. Although this has a slower response time this could also be used, as could the Sagnac interferometer with unbalanced coupling ratio or an attenuator in one arm. These may require the use of a gain medium in the main laser loop.

Figure 6:
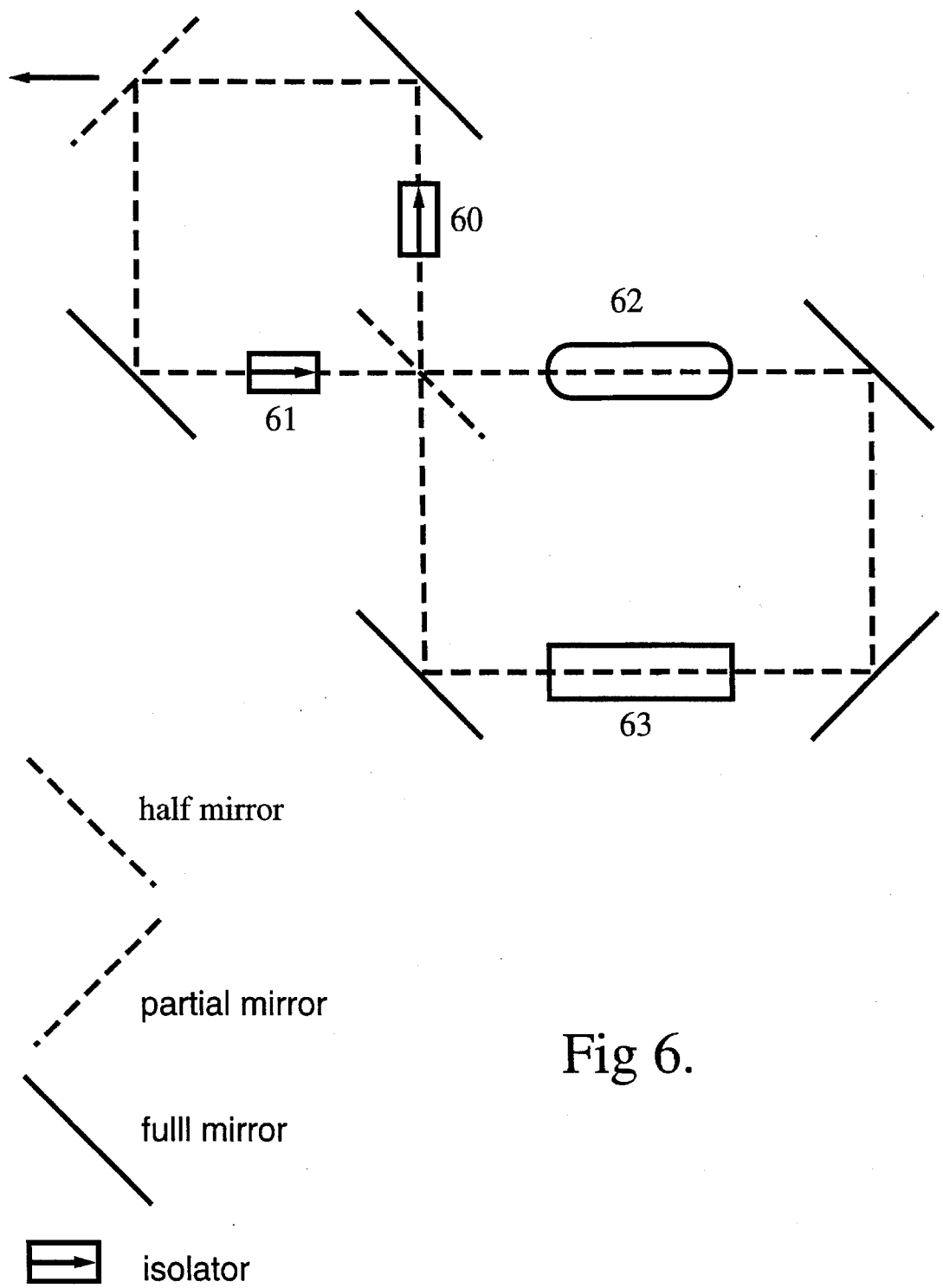
FIG. 6 is a schematic illustration of a bulk optics implementation of the invention.

The present invention may also be realised as a bulk optics laser. A suitable design is shown in FIG. 6. A half mirror takes the place of the fibre coupler, and a nonlinear medium and gain medium are placed within the two alternative paths that the light pulses can take. As in the fibre example, a nonlinear Sagnac interferometer is formed by the optical path passing through gain medium 62 and nonlinear medium 63 (i.e. having an intensity dependent refractive index). The half mirror splits incoming light into counterpropogating components. Clockwise travelling pulses will be amplified before passing through nonlinear medium 63, while counterclockwise pulses will be amplified after passing through nonlinear medium 63. Mode locking is thereby achieved according to the processes described above. Other components may be added to finetune the device as described above and as will be apparent to the reader.

It will be appreciated that the embodiments described are purely illustrative and in no way limit the scope of the invention, and that variations and additions are possible within the spirit and scope of the invention. For instance, it will be understood that while a 50% splitting ratio is described and preferred, the invention may be implemented using different ratio splitting apparatus.

I claim:

1. A mode-locked laser device comprising a first optical fiber path forming a loop, a second optical fiber path forming a loop, and coupling means for connecting said first and second optical paths to form a figure eight topography whereby a light waveform propagating in said second optical path is coupled into said first optical path in the form of two counter-propagating light waveforms; at least one of said first and second optical paths including means for coupling pump light into said device, at least one of said first and second optical paths including means for coupling output pulses from said device, at least one of said first and second optical paths including means for providing optical gain, and at least one of said first and second optical paths including means having a refractive index dependent on light intensity wherein said first and second optical paths operatively propagate light having different polarization modes.

2. A device according to claim 1 wherein one of said first and second optical paths includes both said means for providing optical gain and said means having a refractive index dependent on light intensity.

3. A device according to claim 2, wherein the other of said first and second optical paths includes second means for providing optical gain.

4. A device according to claim 3, wherein said second means for providing gain provides higher gain than said first means.

5. A device according to claim 4, wherein said first means for providing optical gain provides about 4.8 dB of gain.

6. A device according to claim 5, wherein said means comprise polarization maintaining fibre.

7. A device according to claim 2, wherein said second optical path is substantially unidirectional.

8. A device according to claim 2, wherein said first optical path further includes means for controlling polarization.

9. A device according to claim 2, wherein said coupling means has two outputs, and a splitting ratio whereby each of said outputs receives about 50% of the light incident at an input of said coupling means.

10. A device according to claim 2, wherein said means for providing gain comprises a length of erbium doped optical fibre, and said means having a refractive index dependent on light intensity comprises a length of optical fibre.

11. A device according to claim 2, wherein said means for providing gain comprises a length of erbium doped optical fibre, and said means having a refractive index dependent on light intensity comprises a semiconductor optical amplifier.

12. A device according to claim 1, wherein said second optical path is substantially unidirectional.

13. A device according to claim 12, wherein said first optical path further includes means for controlling polarization.

14. A device according to claim 12, wherein said coupling means has two outputs and a splitting ratio whereby each of said outputs receives about 50% of the light incident at an input of said coupling means.

15. A device according to claim 12, wherein said means for providing gain comprises a length of erbium doped optical fibre, and said means having a refractive index dependent on light intensity comprises a length of optical fibre.

16. A device according to claim 12, wherein said means for providing gain comprises a length of erbium doped optical fibre, and said means having a refractive index dependent on light intensity comprises a semiconductor optical amplifier.

17. A device according to claim 1, wherein said first optical path further includes means for controlling polarization.

18. A device according to claim 17, wherein said second optical path is substantially unidirectional.

19. A device according to claim 1 wherein said coupling means has two outputs and a splitting ratio whereby each of said outputs receives about 50% of the light incident at an input of said coupling means.

20. A device according to claim 1, wherein said means for providing gain comprises a length of erbium doped optical fibre, and said means having a refractive index dependent on light intensity comprises a length of optical fibre.

21. A device according to claim 1, wherein said means for providing gain comprises a length of erbium doped optical fibre, and said means having a refractive index dependent on light intensity comprises a semiconductor optical amplifier.

* * * * *